US009420059B2

(12) United States Patent
Lalseta et al.

(10) Patent No.: US 9,420,059 B2
(45) Date of Patent: Aug. 16, 2016

(54) INDICATION OF AUTHORIZED AND UNAUTHORIZED PCC RULES

(75) Inventors: Sachin J. Lalseta, Ottawa (CA); Haiqing H. Ma, Nepean (CA); Lui Chu Yeung, Kanata (CA); Robert A. Mann, Carp (CA)

(73) Assignee: Alcatel Lucent, Boulogne-Billancourt (FR)

(*) Notice: Subject to any disclaimer, the term of this patent is extended or adjusted under 35 U.S.C. 154(b) by 734 days.

(21) Appl. No.: 13/343,457

(22) Filed: Jan. 4, 2012

(65) Prior Publication Data

US 2013/0174212 A1    Jul. 4, 2013

(51) Int. Cl.
| | |
|---|---|
| G06F 17/00 | (2006.01) |
| H04L 29/06 | (2006.01) |
| H04L 29/08 | (2006.01) |
| H04W 12/08 | (2009.01) |

(52) U.S. Cl.
CPC ............ *H04L 67/306* (2013.01); *H04L 63/10* (2013.01); *H04L 63/20* (2013.01); *H04W 12/08* (2013.01)

(58) Field of Classification Search
USPC ............... 726/1; 370/310, 232, 235; 455/433; 709/206, 223, 227, 228, 224
See application file for complete search history.

(56) References Cited

U.S. PATENT DOCUMENTS

| | | | |
|---|---|---|---|
| 2009/0228956 A1* | 9/2009 | He | H04L 63/20 726/1 |
| 2011/0173332 A1* | 7/2011 | Li | H04L 12/14 709/227 |
| 2011/0202485 A1* | 8/2011 | Cutler | H04W 76/022 706/12 |
| 2011/0238547 A1* | 9/2011 | Belling | G06Q 30/04 705/34 |
| 2011/0289196 A1* | 11/2011 | Siddam | H04L 12/1407 709/220 |
| 2012/0021741 A1* | 1/2012 | Pancorbo Marcos | H04L 12/14 455/433 |
| 2012/0064878 A1* | 3/2012 | Castro Castro | H04L 12/14 455/418 |
| 2012/0314632 A1* | 12/2012 | Martinez De La Cruz | H04L 65/1046 370/310 |

OTHER PUBLICATIONS

3GPP TS 29.212, v7.4.0, p. 9, Apr. 2008.*

* cited by examiner

*Primary Examiner* — Kambiz Zand
*Assistant Examiner* — Noura Zoubair
(74) *Attorney, Agent, or Firm* — Kramer & Amado, P.C.

(57) ABSTRACT

Various exemplary embodiments relate to a method and related network node including one or more of the following: receiving the set of PCC rules at the network device from a partner device; determining that the set of PCC rules includes an unauthorized PCC rule, wherein the unauthorized PCC rule fails an authorization; determining that the set of PCC rules includes an authorized PCC rule, wherein the authorized PCC rule passes the authorization; generating an unauthorized rules list including an indication of the unauthorized PCC rule; generating an authorized rules list including an indication of the authorized PCC rule; transmitting the unauthorized rules list and the authorized rules list to the partner device.

20 Claims, 5 Drawing Sheets

INDICATION OF AUTHORIZED AND UNAUTHORIZED PCC RULES

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, 3GPP TS 23.203 and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

The 3GPP has also recommended various procedures for providing roaming access to various users. 3GPP TS 29.215 provides that a visited PCRF may communicate, via an S9 session, with an attached user's home PCRF. Over this S9 session, the visited PCRF may retrieve information useful in providing data flows requested by a user.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for responding to a received set of policy and charging control (PCC) rules, the method including one or more of the following: receiving the set of PCC rules at the network device from a partner device; determining that the set of PCC rules includes an unauthorized PCC rule, wherein the unauthorized PCC rule fails an authorization; determining that the set of PCC rules includes an authorized PCC rule, wherein the authorized PCC rule passes the authorization; generating an unauthorized rules list including an indication of the unauthorized PCC rule; generating an authorized rules list including an indication of the authorized PCC rule; transmitting the unauthorized rules list and the authorized rules list to the partner device.

Various exemplary embodiments relate to a network device for responding to a received set of policy and charging control (PCC) rules, the network device including one or more of the following: an interface that receives the set of PCC rules from a partner device; a roaming rules authorization module configured to: determine that the set of PCC rules includes an unauthorized PCC rule, wherein the unauthorized PCC rule fails an authorization, and determine that the set of PCC rules includes an authorized PCC rule, wherein the authorized PCC rule passes the authorization; and an error reporter configured to: generate an unauthorized rules list including an indication of the unauthorized PCC rule, generate an authorized rules list including an indication of the authorized PCC rule, and transmit the unauthorized rules list and the authorized rules list to the partner device via the interface.

Various exemplary embodiments relate to a tangible and non-transitory machine-readable storage medium encoded with instructions for execution by a network device for responding to a received set of policy and charging control (PCC) rules, the method including one or more of the following: instructions for receiving the set of PCC rules at the network device from a partner device; instructions for determining that the set of PCG rules includes an unauthorized PCC rule, wherein the unauthorized PCC rule fails an authorization; instructions for determining that the set of PCC rules includes an authorized PCC rule, wherein the authorized PCC rule passes the authorization; instructions for generating an unauthorized rules list including an indication of the unauthorized PCC rule; instructions for generating an authorized rules list including an indication of the authorized PCC rule; instructions for transmitting the unauthorized rules list and the authorized rules list to the partner device.

Various embodiments are described wherein: the unauthorized rules list includes a first Charging-Rule-Report attribute-value pair (AVP); and the authorized rules list includes a second Charging-Rule-Report AVP.

Various embodiments are described wherein the second Charging-Rule-Report AVP includes a Rule-Failure-Code AVP and wherein the Rule-Failure-Code AVP indicates a RESOURCE_ALLOCATION_FAILURE code.

Various embodiments are described wherein the step of transmitting the unauthorized rules list and the authorized rules list to the partner device includes: inserting the unauthorized rules list and the authorized rules list into a message, wherein the message includes one of a credit control request (CCR) and a reauthorization answer (RAA); and transmitting the message to the partner device.

Various embodiments are described wherein the unauthorized PCC rule is a predefined PCC rule and the authorization includes determining whether the predefined PCC rule is included in a list of allowed PCC rules.

Various embodiments are described wherein the authorization includes determining whether a quality of service (QoS) requested for a PCC rule is allowable.

Various embodiments are described wherein the authorized rules list includes at least one additional PCC rule.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Upon receiving a set of policy and charging control (PCC) rules, a visited policy and charging rules node (PCRN) may, under various circumstances, determine that one or more of the rules should not be authorized for installation. In such cases, the 3GPP suggests that the visited PCRN should respond to the home PCRN with an error indicating which PCC rules could not be authorized and therefore were not installed. This may create ambiguity with regard to other PCC rules in the set that did pass such authorization. In particular, the home PCRN may not know whether the authorized rules were subsequently installed, creating uncertainty as to what actions should be taken in the future with respect to those rules.

In view of the foregoing, it would be desirable to provide a method of a visited PCRN to inform a home PCRN as to the disposition of authorized PCC rules that happened to be accompanied by unauthorized PCC rules. In particular, it would be desirable for the visited PCRN to unambiguously inform the home PCRN that such authorized rules were not installed.

Referring now to the drawings, in which like numerals refer to like components or steps, there are disclosed broad aspects of various exemplary embodiments.

Figure 1:
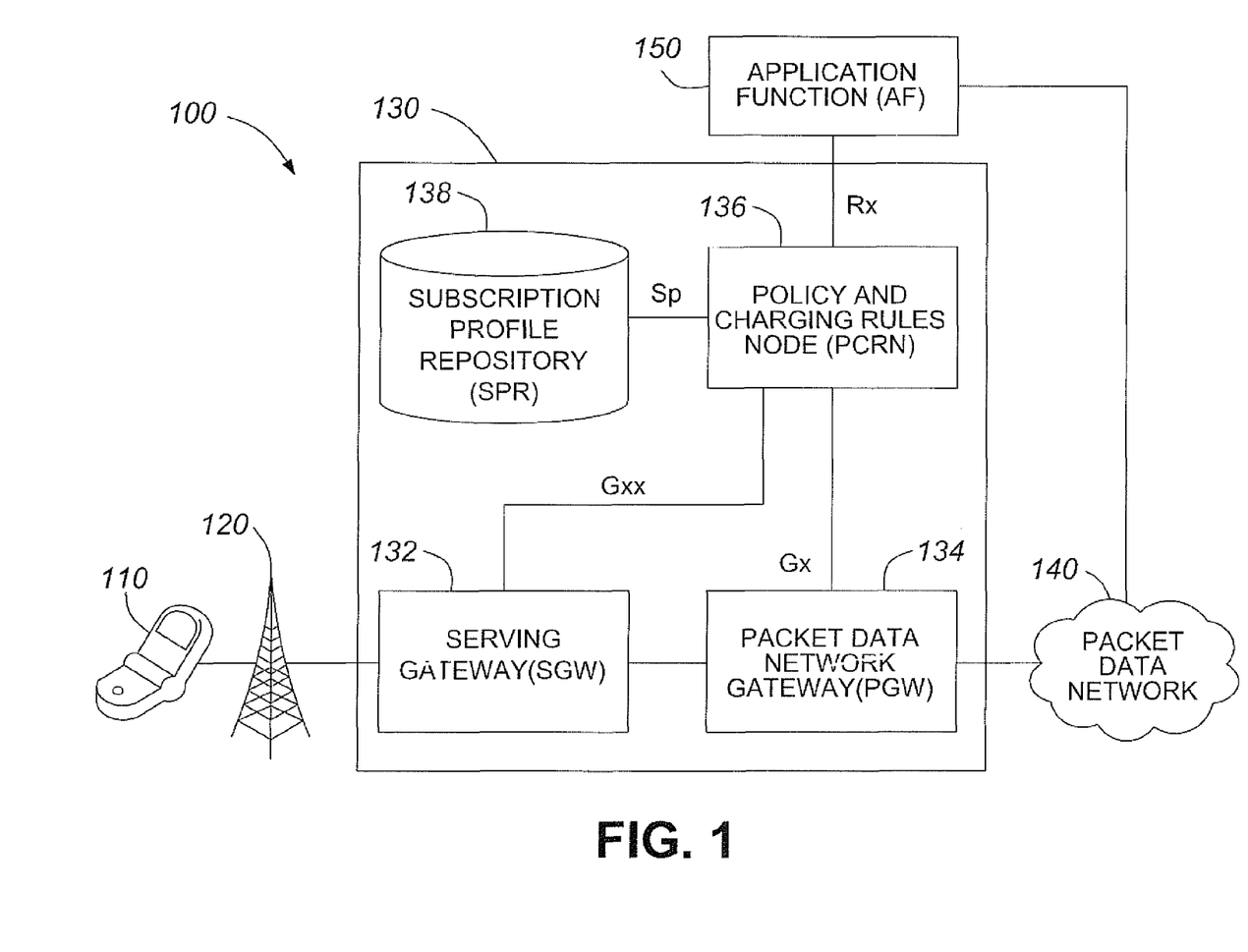
FIG. 1 illustrates an exemplary subscriber network for providing various data services.

FIG. 1 illustrates an exemplary subscriber network 100 for providing various data services. Exemplary subscriber network 100 may be telecommunications network or other network for providing access to various services. In various embodiments, subscriber network 100 may be a public land mobile network (PLMN). Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, 23.203 and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that may receive packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) from AF 150. Upon receipt of the AAR, PCRN 136 may generate at least one new PCC rule for fulfilling the application request.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with an AAR, upon receipt of a CCR, PCRN may generate at least one new PCC rule for fulfilling the application request 170. In various embodiments, the AAR and the CCR may represent two independent application requests to be processed separately, while in other embodiments, the AAR and the CCR may carry information regarding a single application request and PCRN 136 may create at least one PCC rule based on the combination of the AAR and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) according to the Diameter protocol, to notify the PCRN 136 that resources should be allocated for the application service. This application request message may include information such as an identification of the subscriber using the application service, an IP address of the subscriber and/or an APN for an associated IP-CAN session, and/or an identification of the particular service data flows that must be established in order to provide the requested service. AF 150 may communicate such an application request to the PCRN 136 via the Rx interface.

Figure 2:
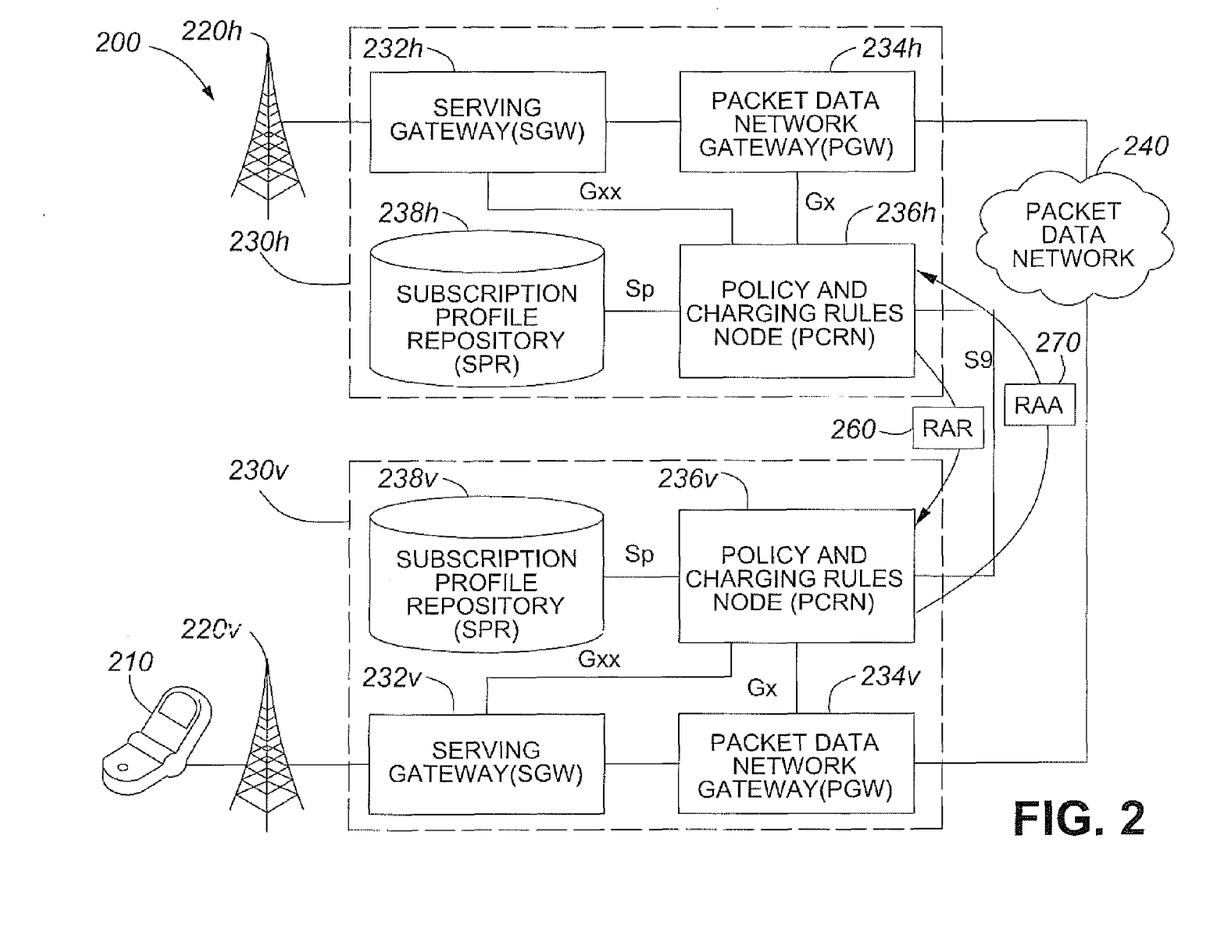
FIG. 2 illustrates an exemplary subscriber network for providing roaming access to various data services.

FIG. 2 illustrates an exemplary subscriber network 200 for providing roaming access to various data services. Exemplary subscriber network 200 may correspond to exemplary network 100. EPC 230v may provide visited access to packet data network 240 for roaming UEs such as UE 210, whereby traffic associated with UE 210 flows through SGW 232v and PGW 234v. In various embodiments, EPC 230v and EPC 230h may connect to the same packet data network 240 (as shown) or may connect to two independent networks. Alternatively or additionally, EPC 230v may provide home-routed access to packet data network 240 for roaming UEs such as UE 210, whereby traffic associated with UE 210 flows through SGW 232v and PGW 234h. Accordingly, SGW 232v may be in communication with PGW 234h. Likewise, SGW 232h may be in communication with PGW 234v, such that EPC 230h may provide similar access to other roaming UEs (not shown) attached to base station 220h.

UE 210 may be in communication with a base station 220v but outside the range of base station 220h. Base station 220v, however, may not connect to a home public land mobile network (HPLMN) for the UE 210. Instead, base station 220v may belong to a visited public land mobile network (VPLMN) with respect to the UE 210 and, as such, may not have access to various data associated with the UE 210, a subscriber associated therewith, and/or other data useful or necessary in providing connectivity to UE 210. For example, SPR 238v may not include information associated with UE 210; instead, such information may be stored in SPR 238h. To enable the provision of service based on subscriber information stored in SPR 238h, PCRN 236v may communicate with PCRN 236h via an S9 session.

In various embodiments, PCRN 236v may forward requests associated with UE 210 to PCRN 236h via an S9 session. PCRN 236h may process these messages to, for example, generate PCC and/or QoS rules. PCRN 236h may then forward these rules to PCRN 236v for installation on PGW 234v and/or SGW 232v. In the case of home-routed access, PCRN 236h may also install PCC rules directly on PGW 234h. In view of the cooperative nature of PCRNs 236h, 236v, these devices may be referred to as "partner devices" with respect to each other.

In various embodiments, each partner device may be capable of operating as a home device and a visited device. For example, if another roaming UE (not shown) were attached to base station 220h, PCRN 236h may be additionally capable of forwarding requests to PCRN 236v and PCRN 236v may be capable of returning appropriate rules to PCRN 236h for installation.

In providing service to UE 210, home PCRN 236h may be configured to generate and send PCC rules to visited PCRN 236v for installation at a PGW such as PGW 234v. As shown, home PCRN 236h may transmit a reauthorization request (RAR) 260 including a set of PCC rules to visited PCRN 236v. In various embodiments, PCRN 236h may additionally or alternatively transmit a credit control answer (CCA) (not shown) to communicate a set of PCC rules to PCRN 236v.

Upon receiving a set of PCC rules, visited PCRN 236v may first determine whether each PCC rule is authorized for installation. For example, PCRN 236v may determine whether the rule is on a predefined list of allowable rules and/or determine whether installation of the rule would exceed some quality of service (QoS) limit. If all the rules are authorized, visited PCRN 236v may proceed to install the rules at a PGW such as PGW 234v. If at least one of the PCC rules does not pass authorization however, visited PCRN 236v may refrain from installing any of the PCC rules and respond to home PCRN 236h with an error message. As illustrated, visited PCRN 236v may respond to RAR 260 with a reauthorization answer (RAA) 270 including the error indication. In various embodiments, PCRN 236v may alternatively or additionally transmit such an error indication in the form of a credit control request (CCR) (not shown). For example, if the rules were received in a RAR, PCRN 236v may transmit a RAA, and if the rules were received in a CCA, PCRN 236v may transmit a CCR.

The error indication transmitted by visited PCRN 236v to home PCRN 236h may include both a list of PCC rules that were not authorized for installation and a list of PCC that were authorized but not installed due to the presence of unauthorized rules. For example, visited PCRN 236 may transmit an RAA 270 or CCR (not shown) including two Charging-Rule-Report attribute-value-pairs (AVP). One of these AVPs may include an indication of each unauthorized rule, while the other AVP may include an indication of each authorized rule. Home PCRN 236*h* may then use this information to take further action. For example, home PCRN 236*h* may resend only those rules that were authorized and/or may modify and resend the unauthorized rules.

Figure 3:
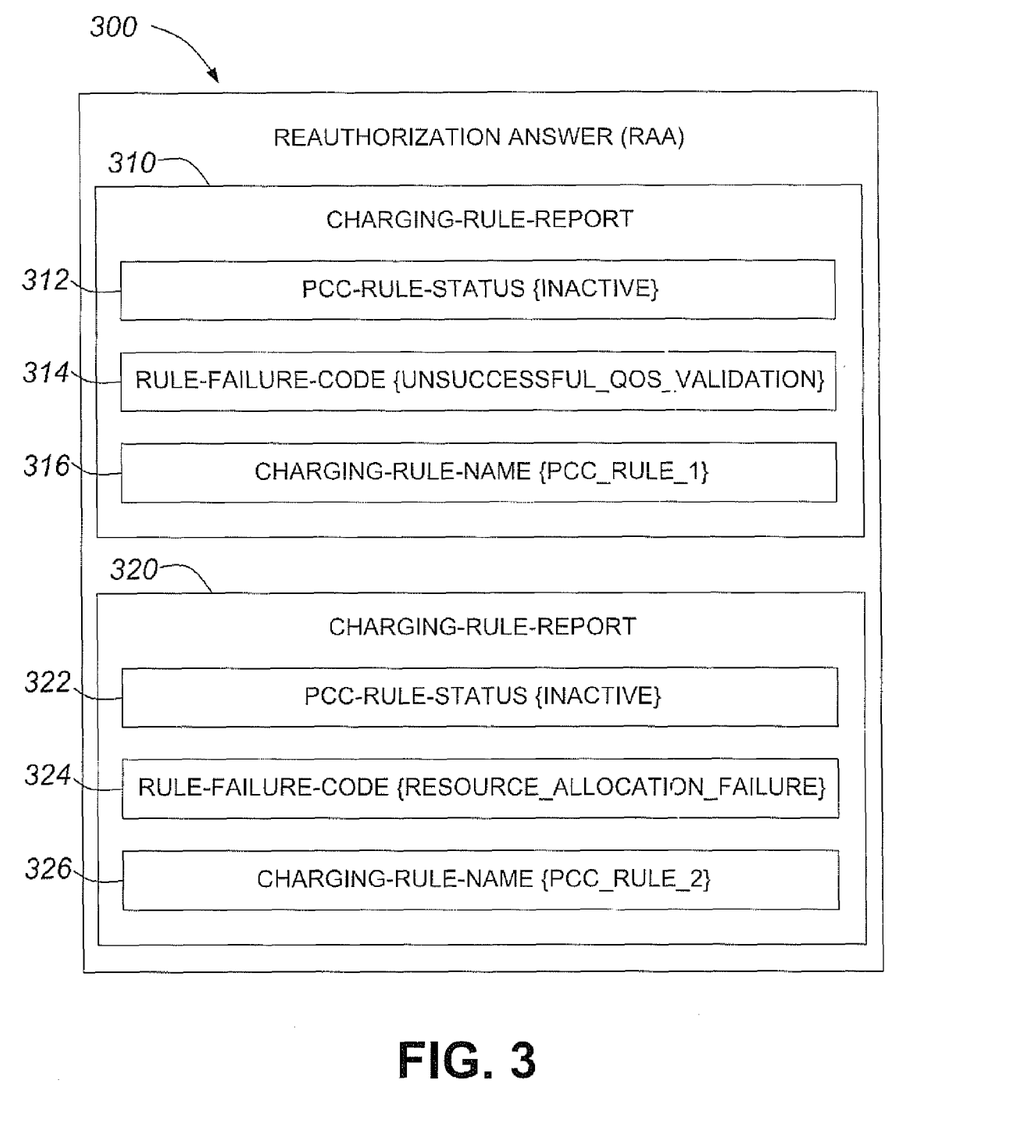
FIG. 3 illustrates an exemplary message for reporting unauthorized and authorized rules.

FIG. 3 illustrates an exemplary message 300 for reporting unauthorized and authorized rules. Exemplary message 300 may correspond to RAA 270 of FIG. 2. Accordingly, exemplary message may be constructed as a reauthorization answer according to the Diameter protocol. In various embodiments, exemplary message 300 may alternatively be constructed as a credit control request according to the Diameter protocol. As such, message 300 may include a number of attribute-value pairs (AVPs). For example, message 300 may include a first Charging-Rule-Report AVP 310 and a second Charging-Rule-Report AVP 320. Message 300 may include numerous additional AVPs (not shown).

Charging-Rule-Report AVP 310 may constitute an unauthorized rules list. As such, Charging-Rule-Report AVP 310 may include a PCC-Rule-Status AVP 312 indicating that the listed rules may be inactive and a Rule-Failure-Code AVP 314 indicating that the rules may have not passed an authorization. For example, Rule-Failure-Code AVP 314 indicates an error code of UNSUCCESSFUL_QOS_VALIDATION. Charging-Rule-Report AVP 310 may also include one or more Charging-Rule-Name AVPs, such as Charging-Rule-Name AVP 316, including indications of which PCC rules were not authorized. As an example, Charging-Rule-Name AVP 316 includes the PCC rule name PCC_RULE_1 to indicate that PCC_RULE_1 is an unauthorized PCC rule.

In contrast, Charging-Rule-Report AVP 320 may constitute an authorized rules list. As such, Charging-Rule-Report AVP 320 may indicate one or more PCC rules that passed authorization but were not installed. Charging-Rule-Report AVP 320 may include a PCC-Rule-Status AVP 322 indicating that the listed rules may be inactive and a Rule-Failure-Code AVP 324 indicating that the rules passed authorization. In various embodiments, Rule-Failure-Code AVP 324 may include an error code that may be repurposed to indicate to a home PCRN that the listed rules indeed passed authorization. As an example, Rule-Failure-Code AVP 324 may include the error code RESOURCE_ALLOCATION_FAILURE. While this error code may normally indicate a different error, when used in a message from a visiting PCRN to a home PCRN, the error code may carry the alternative meaning that the listed rules passed authorization but were not installed. Charging-Rule-Report AVP 320 may also include one or more Charging-Rule-Name AVPs, such as Charging-Rule-Name AVP 326, including indications of which PCC rules were authorized. As an example, Charging-Rule-Name AVP 326 includes the PCC rule name PCC_RULE_2 to indicate that PCC_RULE_2 is an authorized PCC rule but was not installed.

It should be noted that, while various embodiments are described as reporting rules that were authorized but not installed, various alternative embodiments may exist. For example, in various embodiments a visited PCRN may install rules passing authorization even when another received rule does not pass authorization. In such cases, a selected value for a Rule-Failure-Code AVP may indicate that the listed PCC rules were installed. Various additional modifications will be apparent to those of skill in the art.

Figure 4:
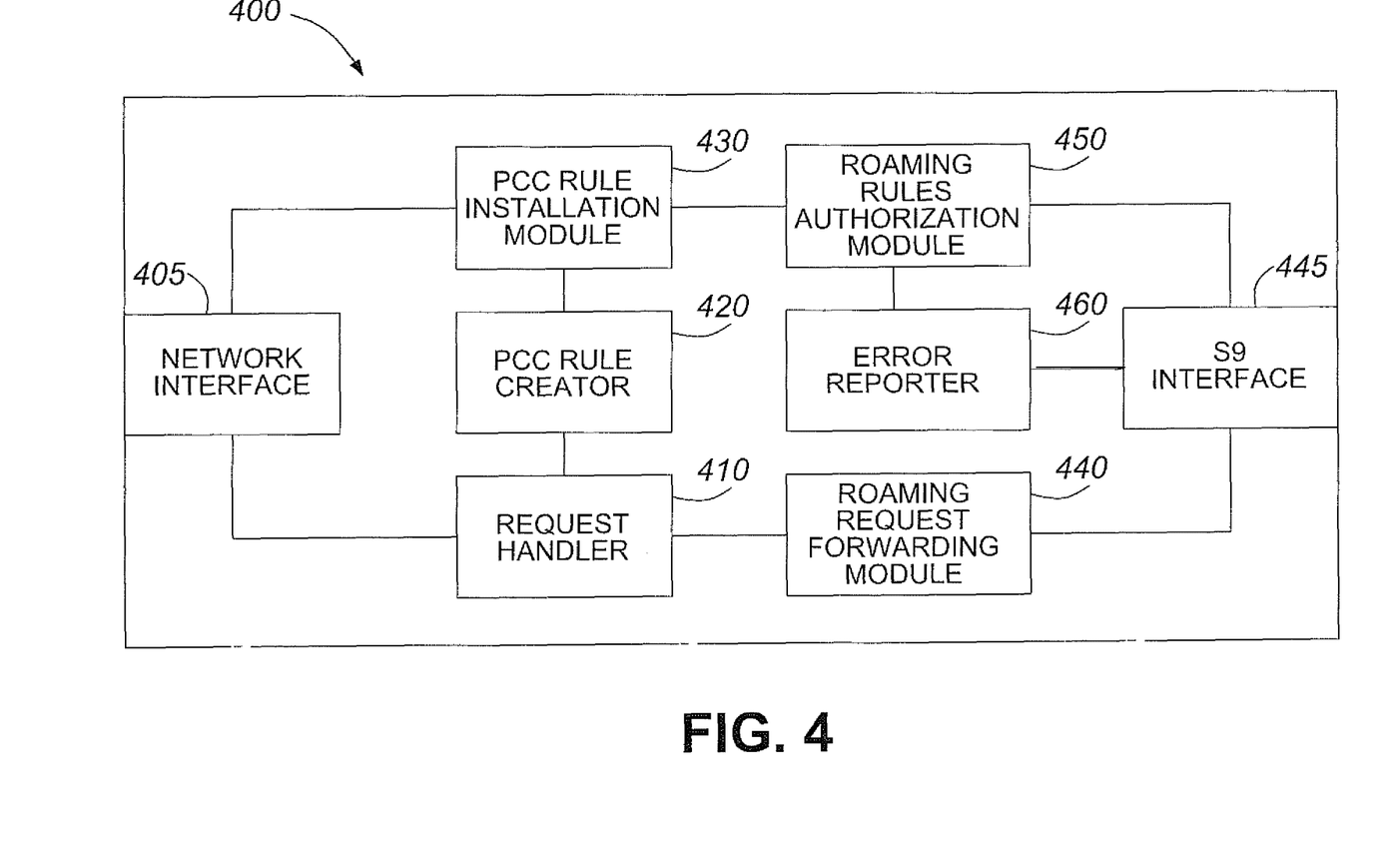
FIG. 4 illustrates an exemplary policy and charging rules node (PCRN) for reporting unauthorized and authorized rules.

FIG. 4 illustrates an exemplary policy and charging rules node (PCRN) 400 for reporting unauthorized and authorized rules. PCRN 400 may correspond to one or more of PCRNs 136, 236*h*, and 236*v*. PCRN 400 may include a network interface 405, request handler 410, PCC rule creator 420, PCC rule installation module 430, roaming request forwarding module 440, S9 interface 445, roaming rules authorization module 450, and/or error reporter 460. Various additional or alternative components necessary or useful in implementing a PCRN will be apparent to those of skill in the art.

Network interface 405 may be an interface comprising hardware and/or executable instructions encoded on a machine-readable storage medium configured to communicate with at least one other device such as, for example, a PGW and/or AF. Accordingly, network interface 405 may include a Gx, Gxx, and/or Rx interface. In various embodiments, network interface 405 may be an Ethernet interface. During operation, network interface 405 may receive a request message including a request for one or more PCC rules from another device and forward the message to request handler 410.

Request handler 410 may include hardware and/or executable instructions on a machine-readable storage medium configured to determine, for an incoming request message, which module should process the message. For example, request handler 410 may determine whether a received message is associated with a roaming subscriber by determining whether one or more subscription identifiers carried by the message are associated with a subscriber known to the PCRN 400. If the subscriber is known to the PCRN 400, request handler 410 may forward the request message to PCC rule creator 420. Otherwise, the message may be a roaming message, and request handler 410 may forward the message to roaming request forwarding module 440.

PCC rule creator 420 may include hardware and/or executable instructions on a machine-readable storage medium configured to generate PCC rules based on a received request for PCC rules. As such, PCC rule creator 420 may include, for example, a rules engine for determining how to construct each new PCC rule based on various data such as the request itself, subscriber data, available resources, and other contextual information. After generating one or more PCC rules, PCC rule creator 420 may forward the new PCC rule(s) to PCC rule installation module 430.

PCC rule installation module 430 may include hardware and/or executable instructions on a machine-readable storage medium configured to install one or more PCC rules received from PCC rule creator 420 and/or roaming rules authorization module 450 on a PGW. Accordingly, PCC rule installation module 430 may construct a CCA or RAR including the rules to be installed and transmit the message to an appropriate PGW for installation via network interface 405.

Roaming request forwarding module 440 may include hardware and/or executable instructions on a machine-readable storage medium configured to transmit a roaming request message to an appropriate partner device via S9 interface 445. Accordingly, roaming request forwarding module 440 may determine which partner device is associated with the roaming request and subsequently transmit the request to the partner device as specified by the S9 protocol. In various embodiments, forwarding the message may include converting the received request from the Gx, Gxx, or Rx protocol to the S9 protocol.

S9 interface 445 may be an interface comprising hardware and/or executable instructions encoded on a machine-readable storage medium configured to communicate with at least one partner device, such as another PCRN, according to the S9 protocol as described in 3GPP TS 29.215. In various embodiments, S9 interface 445 may be an Ethernet interface. S9 interface 445 may utilize the same hardware as network interface 405.

Roaming rules authorization module 450 may include hardware and/or executable instructions on a machine-readable storage medium configured to receive a set of PCC rules from a partner device via S9 interface 445 and determine whether the PCC rules are authorized for installation. Such rules may be received in a CCA in response to a message previously forwarded to the partner device by roaming request forwarding module 440 and/or may be received in a RAR unsolicited by PCRN 400. Each PCC rule may be predefined or dynamic. Predefined PCC rules may be previously known to PCRN 400 by a particular PCC rule name while dynamic PCC rules may have been created specifically in response to a recent request message. Various forms of PCC rule authorization will be apparent to those of skill in the art. For example, in the case of a predefined rule, roaming rules authorization module may refer to a list of predefined rules that are allowable. This list of allowed PCC rules may apply to, for example, all sessions handled by PCRN 400, all sessions involving the particular subscriber, all sessions involving a particular partner device, and/or all sessions associated with a particular roaming agreement. Any predefined rule not on the list may be rejected by roaming rules authorization module as unauthorized. As another example, roaming rules authorization module may determine whether one or more QoS metrics defined by a PCC rule is allowable. This determination may be based on for example, whether the defined QoS is currently available and/or whether the defined QoS is allowable for a particular subscriber. Various additional or alternative PCC rule authorization methods will be apparent to those of skill in the art. If all rules in the set are authorized, roaming rules authorization module 450 may forward the set of rules to PCC rule installation module 430. Otherwise, roaming rules authorization module 450 may forward the set of rules to error reporter 460 along with an indication of which rules passed authorization and which did not.

Error reporter 460 may include hardware and/or executable instructions on a machine-readable storage medium configured to receive a set of PCC rules from roaming rules authorization module 450 and construct an error message for transmission to the partner device via S9 interface 445. In doing so, error reporter 460 may be configured to generate a list of unauthorized PCC rules and a list of authorized PCC rules. These lists may each constitute a Charging-Rule-Report AVP, as described above with regard to FIG. 3. After generating these lists, error reporter 460 may insert them into a message such as an RAA or CCR and subsequently transmit the message to the partner device via S9 interface 445.

Figure 5:
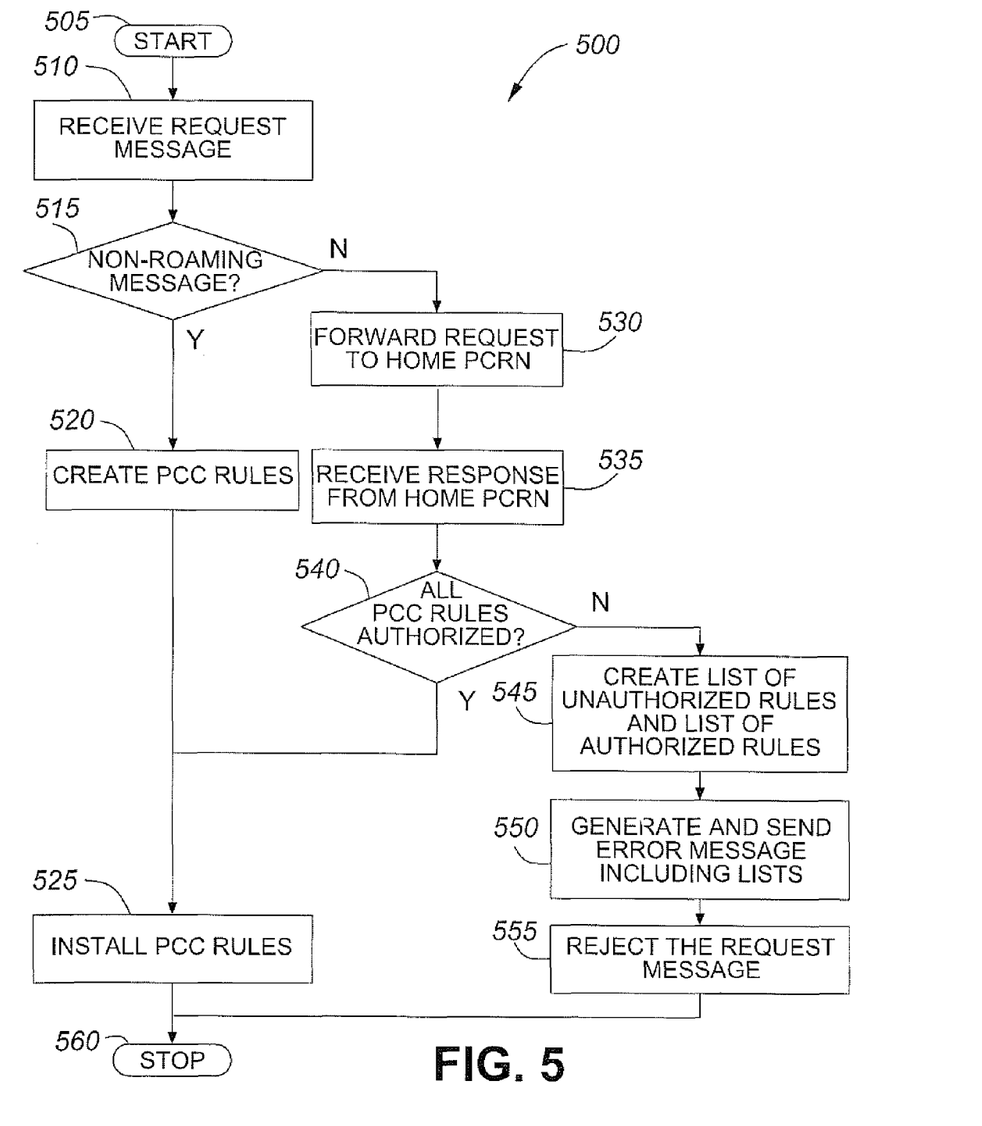
FIG. 5 illustrates an exemplary method for reporting unauthorized and authorized rules.

FIG. 5 illustrates an exemplary method 500 for reporting unauthorized and authorized rules. Method 500 may be performed by the components of a PCRN such as PCRN 136, 236h, 236v, and/or 400 to process a received roaming request.

Method 500 may begin in step 505 and proceed to step 510 where the PCRN may receive a request message from another device such as a PGW. Next, in step 515, the PCRN may determine whether the message is a roaming or non-roaming message. If the message is associated with a subscriber known to the PCRN, the message may be classified as non-roaming and method 500 may proceed to step 520. In step 520, the PCRN may process the request message by generating one or more PCC rules useful in fulfilling the request. It should be apparent that the local processing of a non-roaming message described may be in some respects a simplification. For example, PCRN may determine in step 520 that the request should be rejected and that no PCC rules should be created. Various alternative actions for request processing will be apparent to those of skill in the art. After processing the request message in step 520, method 500 may proceed to step 525.

If, on the other hand, the message is a roaming message, method 500 may proceed from step 515 to step 530, where the PCRN may forward the request to the appropriate home PCRN. This step may include converting the received request into an S9-formatted request for transmission to the home PCRN. After transmission of the request, method 500 may proceed to step 535, where the PCRN may receive a response from the home PCRN. This response may include a set of PCC rules for fulfilling the request received in step 510. In step 540, the PCRN may attempt to authorize each of the PCC rules in the set. For example, the PCRN may determine whether each rule is on a list of allowed or blocked predefined rules and/or determine whether on or more QoS requirements carried by the rule are allowable. If all of the rules are authorized, method 500 may proceed to step 525. In step 525, the PCRN may install the PCC rules in an appropriate PGW. Method 500 may then end in step 560.

If one or more of the rules do not pass authorization, however, method 500 may proceed from step 540 to step 545, where the PCRN may create a list of unauthorized rules and a list of authorized rules. For example, the PCRN may create two Charging-Rule-Report AVPs including indications of the unauthorized rules and authorized rules, respectively. Then, in step 550, the PCRN may complete generation of an error message including the two lists created in step 545 and transmit the error message to the home PCRN. Finally, in step 555, the PCRN may reject the request massage received in step 510 by, for example, sending a CCA to the requesting device including an indication of the rejection. Method 500 may then end in step 560.

It should be apparent that various steps described with regard to method 500 may be used in processing PCC rules received from a home PCRN not in response to a forwarded request. For example, if the visited PCRN receives a RAR including a set of PCC rules, the visited PCRN may utilize steps similar to steps 525, 535, 540, 545, and/or 550 to process the received message. Various modifications for processing such unsolicited sets of PCC rules will be apparent to those of skill in the art.

According to the foregoing, various embodiments enable a visited PCRN and a home PCRN to maintain consistent state information when rules are not installed at the visited PCRN. In particular, by including a list of authorized rules and a list of unauthorized rules in a response message from the visited PCRN to the home PCRN, the home PCRN is informed of the status of each rule previously transmitted for installation.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for responding to a received set of policy and charging control (PCC) rules, the method comprising:
    receiving the set of PCC rules at the network device from a partner device,
        wherein each PCC rule of the set of PCC rules has a respective PCC rule identifier;
    determining that the set of PCC rules includes an unauthorized PCC rule, wherein the unauthorized PCC rule fails an authorization;
    determining that the set of PCC rules includes an authorized PCC rule, wherein the authorized PCC rule passes the authorization;
    generating an unauthorized rules list including the PCC rule identifier of the unauthorized PCC rule;
    generating an authorized rules list including the PCC rule identifier of the authorized PCC rule;
    transmitting the unauthorized rules list and the authorized rules list to the partner device.

2. The method of claim 1, wherein:
    the unauthorized rules list comprises a first Charging-Rule-Report attribute-value pair (AVP); and
    the authorized rules list comprises a second Charging-Rule-Report AVP.

3. The method of claim 2, wherein the second Charging-Rule-Report AVP includes a Rule-Failure-Code AVP and wherein the Rule-Failure-Code AVP indicates a RESOURCE_ALLOCATION_FAILURE code.

4. The method of claim 1, wherein the step of transmitting the unauthorized rules list and the authorized rules list to the partner device comprises:
    inserting the unauthorized rules list and the authorized rules list into a message, wherein the message comprises one of a credit control request (CCR) and a reauthorization answer (RAA); and
    transmitting the message to the partner device.

5. The method of claim 1, wherein the unauthorized PCC rule is a predefined PCC rule and the authorization comprises determining whether the predefined PCC rule is included in a list of allowed PCC rules.

6. The method of claim 1, wherein the authorization comprises determining whether a quality of service (QoS) requested for a PCC rule is allowable.

7. The method of claim 1, wherein the authorized rules list includes at least one additional PCC rule.

8. A network device for responding to a received set of policy and charging control (PCC) rules, the network device comprising:
    an interface that receives the set of PCC rules from a partner device,
        wherein each PCC rule of the set of PCC rules has a respective PCC rule identifier;
    a roaming rules authorization module configured to:
        determine that the set of PCC rules includes an unauthorized PCC rule, wherein the unauthorized PCC rule fails an authorization, and
        determine that the set of PCC rules includes an authorized PCC rule, wherein the authorized PCC rule passes the authorization; and
    an error reporter configured to:
        generate an unauthorized rules list including the PCC rule identifier of the unauthorized PCC rule,
        generate an authorized rules list including the PCC rule identifier of the authorized PCC rule, and
        transmit the unauthorized rules list and the authorized rules list to the partner device via the interface.

9. The network device of claim 8, wherein:
    the unauthorized rules list comprises a first Charging-Rule-Report attribute-value pair (AVP); and
    the authorized rules list comprises a second Charging-Rule-Report AVP.

10. The network device of claim 9, wherein the second Charging-Rule-Report AVP includes a Rule-Failure-Code AVP and wherein the Rule-Failure-Code AVP indicates a RESOURCE_ALLOCATION_FAILURE code.

11. The network device of claim 8, wherein, in transmitting the unauthorized rules list and the authorized rules list to the partner device, the error reporter is configured to:
    insert the unauthorized rules list and the authorized rules list into a message, wherein the message comprises one of a credit control request (CCR) and a reauthorization answer (RAA); and
    transmit the message to the partner device.

12. The network device of claim 8, wherein the unauthorized PCC rule is a predefined PCC rule and the authorization comprises determining whether the predefined PCC rule is included in a list of allowed PCC rules.

13. The network device of claim 8, wherein the authorization comprises determining whether a quality of service (QoS) requested for a PCC rule is allowable.

14. A tangible and non-transitory machine-readable storage medium encoded with instructions for execution by a network device for responding to a received set of policy and charging control (PCC) rules, the method comprising:
    instructions for receiving the set of PCC rules at the network device from a partner device,
        wherein each PCC rule of the set of PCC rules has a respective PCC rule identifier;
    instructions for determining that the set of PCC rules includes an unauthorized PCC rule, wherein the unauthorized PCC rule fails an authorization;
    instructions for determining that the set of PCC rules includes an authorized PCC rule, wherein the authorized PCC rule passes the authorization;
    instructions for generating an unauthorized rules list including the PCC rule identifier of the unauthorized PCC rule;
    instructions for generating an authorized rules list including the PCC rule identifier of the authorized PCC rule;
    instructions for transmitting the unauthorized rules list and the authorized rules list to the partner device.

15. The tangible and non-transitory machine-readable storage medium of claim 14, wherein:
    the unauthorized rules list comprises a first Charging-Rule-Report attribute-value pair (AVP); and the authorized rules list comprises a second Charging-Rule-Report AVP.

16. The tangible and non-transitory machine-readable storage medium of claim 15, wherein the second Charging-Rule-Report AVP includes a Rule-Failure-Code AVP and wherein the Rule-Failure-Code AVP indicates a RESOURCE_ALLOCATION_FAILURE code.

17. The tangible and non-transitory machine-readable storage medium of claim 14, wherein the instructions for transmitting the unauthorized rules list and the authorized rules list to the partner device comprise:
  instructions for inserting the unauthorized rules list and the authorized rules list into a message, wherein the message comprises one of a credit control request (CCR) and a reauthorization answer (RAA); and
  instructions for transmitting the message to the partner device.

18. The tangible and non-transitory machine-readable storage medium of claim 14, wherein the unauthorized PCC rule is a predefined PCC rule and the authorization comprises determining whether the predefined PCC rule is included in a list of allowed PCC rules.

19. The tangible and non-transitory machine-readable storage medium of claim 14, wherein the authorization comprises determining whether a quality of service (QoS) requested for a PCC rule is allowable.

20. The tangible and non-transitory machine-readable storage medium of claim 14, wherein the authorized rules list includes at least one additional PCC rule.

\* \* \* \* \*